United States Patent [19]

Joguet

[11] Patent Number: 5,001,488
[45] Date of Patent: Mar. 19, 1991

[54] BATTLEFIELD IFF METHOD AND SYSTEM FOR ITS APPLICATION

[75] Inventor: Jean-Claude Joguet, Noisy Le Roi, France

[73] Assignee: LMT Radio Professionnelle, Boulogne Billancourt, France

[21] Appl. No.: 515,694

[22] Filed: Apr. 26, 1990

Related U.S. Application Data

[63] Continuation of Ser. No. 471,079, Jan. 30, 1990, abandoned, which is a continuation of Ser. No. 108,709, Oct. 15, 1987, abandoned.

[30] Foreign Application Priority Data

Oct. 15, 1986 [FR] France .................. 86 14297

[51] Int. Cl.⁵ .............................................. G01S 9/56
[52] U.S. Cl. ...................................... 342/45; 455/604
[58] Field of Search ........................ 342/13, 45, 53; 455/604

[56] References Cited

U.S. PATENT DOCUMENTS

| | | | |
|---|---|---|---|
| 2,472,136 | 6/1940 | Whitlock | 342/45 X |
| 3,010,102 | 11/1961 | Ketchledge et al. | |
| 3,104,478 | 9/1963 | Strauss et al. | 342/53 X |
| 3,296,615 | 1/1967 | Page et al. | 342/45 |
| 3,802,780 | 4/1974 | Helm et al. | |
| 3,813,553 | 5/1974 | Grossman | 455/604 X |
| 4,144,534 | 3/1979 | Prickett et al. | 342/45 X |
| 4,145,690 | 3/1979 | Petitjeau et al. | 342/45 |
| 4,361,911 | 11/1982 | Buser et al. | |
| 4,497,065 | 1/1985 | Tisdale et al. | |
| 4,566,009 | 1/1986 | Hanni et al. | 342/45 |

FOREIGN PATENT DOCUMENTS

| | | | |
|---|---|---|---|
| 2215463 | 10/1973 | Fed. Rep. of Germany | |
| 2251295 | 5/1974 | Fed. Rep. of Germany | |
| 2223633 | 10/1977 | Fed. Rep. of Germany | 342/53 |
| 3113154 | 12/1982 | Fed. Rep. of Germany | |

Primary Examiner—Mark Hellner
Attorney, Agent, or Firm—Oblon, Spivak, McClelland, Maier & Neustadt

[57] ABSTRACT

An IFF system interrogating station comprises an IFF interrogator which has its transmission antenna joined to the infra-red camera of a field observation device. Each friendly vehicle is fitted with an IFF receiver antenna and an infra-red laser transmitter transmitting a laser pulse at each IFF interrogation.

8 Claims, 1 Drawing Sheet

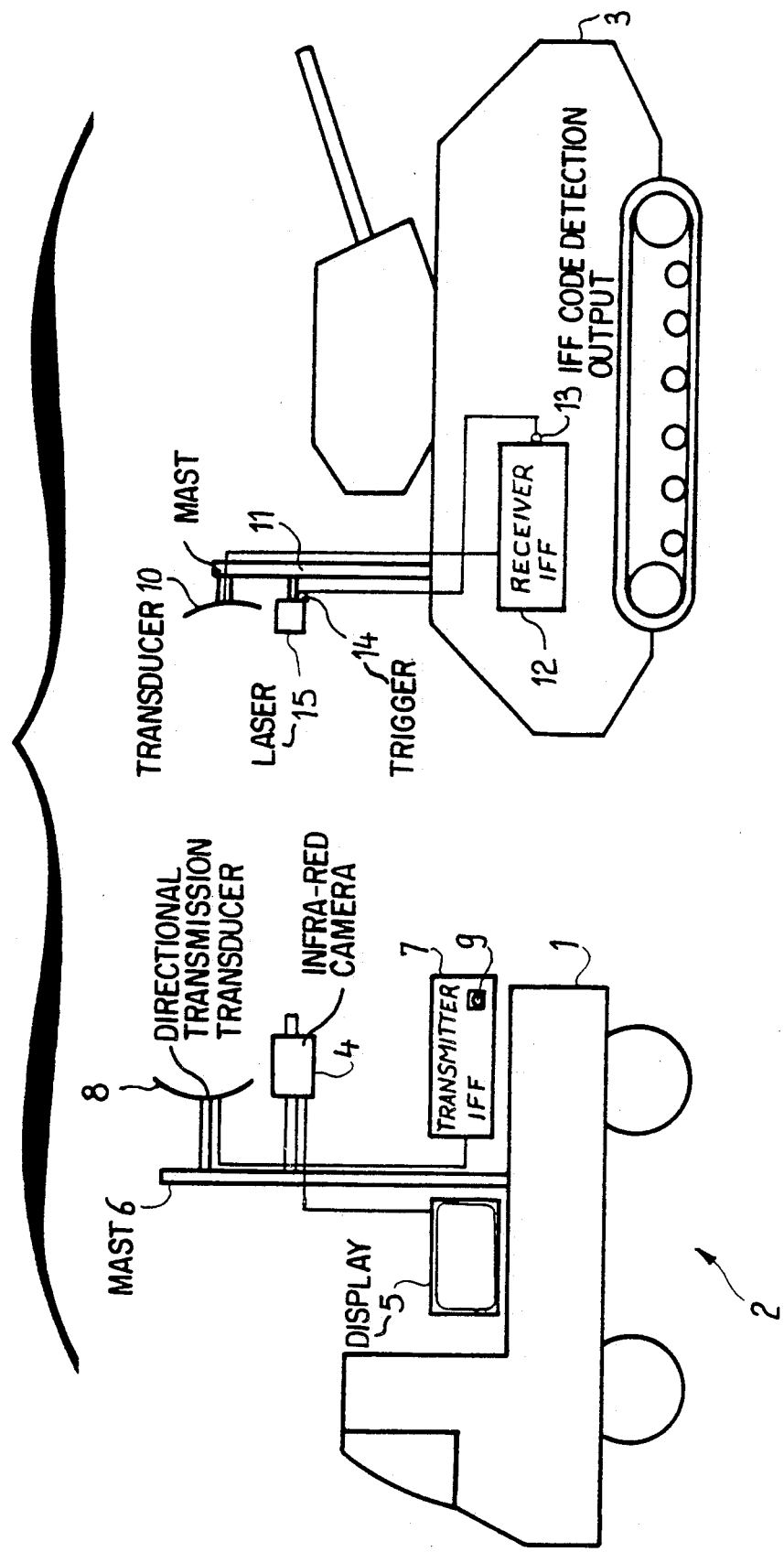

BATTLEFIELD IFF METHOD AND SYSTEM FOR ITS APPLICATION

This application is a continuation of application Ser. No. 07/471,079, filed on Jan. 30, 1990, now abandoned, which is a continuation of application Ser. No. 07/108,709, filed on Oct. 15, 1987, now abandoned.

BACKGROUND OF THE INVENTION

1. Field of the Invention

The present invention pertains to a method for the identification of friend or foe (IFF) on the battlefield as well as to a system for the application of this method.

2. Description of the Prior Art

Currently used IFF systems are of the question and answer type. Their disadvantage is that they are complicated because they transmitters/receiver units on both the interrogation and the responding side and must, furthermore, have means to associate targets detected by a primary sensor with identified targets.

The present invention pertains to a battlefield IFF method which can be used to establish an immediate correlation between the detection and identification of targets, with the minimum risk of intrusion.

Another object of the present invention is a battlefield IFF system which is simpler and less expensive than prior art systems.

3. Summary of the Invention

According to the battlefield IFF method of the invention, as soon as a vehicle is detected in a zone under surveillance by an infra-red camera, at least one coded IFF interrogation is transmitted to this vehicle and, if the said vehicle is a friendly one, it transmits an infra-red laser pulse to the interrogator as soon as it receives the interrogation.

According to an advantageous aspect of a method of the invention, to prevent attempts at intrusion, the interrogator also sends no-response codes to which a friendly vehicle must not respond.

The battlefield IFF system of the invention comprises an IFF interrogator with its transmission transducer, which can move rotationally, being mechanically coupled to an infra-red receiving camera connected to a display device. Furthermore, in the said system, each friendly vehicle has a reception transducer that works in cooperation with the said transmission transducer, the said reception transducer being connected to an IFF receiver which has its IFF signals decoding output connected to a laser pulse triggering input of an infra-red laser source, the transmitter of the said source being pointed in the same direction as the said receiving transducer.

BRIEF DESCRIPTION OF THE DRAWING

The present invention will be better understood from the following detailed description of an embodiment taken as a non-exhaustive example and illustrated by the appended single drawing which is a simplified block diagram of a system according to the invention.

DESCRIPTION OF THE PREFERRED EMBODIMENT

To simplify the drawing, in addition to the vehicle 1 of the interrogating station 2, only one friendly vehicle 3 has been shown, but it is clearly understood that the system of the invention applies to any number of friendly vehicles. Enemy vehicles have not been shown.

The interrogating station 1 has a conventional infra-red surveillance device comprising essentially an infra-red camera 4 and a display device 5 such as a television screen. The camera 4 is fixed on a substantially vertical rotating mast 6 so that it can explore a certain area of the battlefield terrain. The mast 6 can rotate on its axis either continuously in the same direction, thus sweeping through an angle of 360°, or alternately in one direction and then the other, sweeping through an angle of a few tens of degrees.

The station 1 further comprises a transmitter 7 of encoded IFF interrogations connected to a directional transmission transducer 8 which is fixed to the mast 6 and pointed in the same direction as the camera 4. In the example shown, the transmitter 7 functions in the radar frequency bands, preferably in the X or Ku band, and the transducer 8 is therefore a radar type of antenna with appropriate characteristics. However, the invention is not limited to one such type of wavelength, and it is possible to use, for example, a laser transmission to send the IFF code, the transducer 8 then being a laser transmitter. In particular, the transmitter 7 has a button 9 which the operator of the station 1 manipulates whenever he wishes to send an IFF code.

The friendly vehicle 3 has a directional reception transducer fixed to a substantially vertical mast 11, the said transducer being suitably pointed so that it can receive the transmissions of station 1. Advantageously, the mast 11 is rotational and can rotate through 360°. In the example shown, the transducer 10 is a radar type of antenna which can receive the waves transmitted by the antenna 8. In the case, mentioned above, of a laser interrogation transmission, the transducer 10 would be a photosensitive device of a type appropriate to the laser wavelength to be received.

The transducer 10 is connected to an IFF receiver 12, the IFF code detection output 13 of which is connected to the triggering input 14 of a laser source 15 which has a wavelength that can be received by the camera 4. This source 15 is fixed to the mast 11. The transmitter of the source 15 is pointed in the same direction as the transducer 10.

The signal transmitted by the transmitter 7 preferably has a wide spectrum so as to reduce the chances of its being identified by the enemy. The recurrence of the IFF interrogator signal is advantageously about 1 KHz. When the transducer 8 can produce side lobes (as with a conventional radar antenna), the transmitter 7 is made to transmit, in a manner known per se, a side lobe suppression (SLS) signal radiated by an ancillary antenna (not shown), and covering the side lobes of the antenna 8.

Upon the reception of each friendly interrogation (transmitted by the station 1), the receiver 12 of the vehicle 3 decodes it and immediately triggers the laser source 15 in response. Of course, since the transducer 10 is directional, it cannot receive any interrogation unless its receiving lobe is pointed towards the station 1.

It is also understood that any reception, by the transducer 10, of an SLS signal at a level higher than that of the interrogation signal, inhibits the triggering of the source 15 in a manner known per se.

The station 1 operator, who monitors the terrain on the screen of the display device 5 connected to the infra-red camera 4, presses the button 9 as soon as he detects vehicles. The action of pressing the button 9 makes the transmitter 7 transmit a burst of IFF encoded interrogations towards the area under surveillance.

Friendly vehicles, fitted with an IFF device according to the invention, automatically trigger their laser source 15 whenever the reception lobe of their rotating antenna 10 passes through the direction of the station 1, and they do so for as long as the IFF interrogations are received. The station 1 operator then sees flashing dots of lights from friendly vehicles on his screen throughout the period during which he interrogates them. It is understood that the operator must ascertain that these dots of light go out when he stops interrogating them.

Advantageously, the transmitter 7 can also transmit a "no-response" code, namely a code which is different from the true IFF code of the station 1, but which resembles, at first analysis, an IFF interrogating code: it can do this either routinely in alternation with the IFF interrogating code or at the operator's request. No friendly vehicle should respond to a no-response code of this type since the receiver 12 of each of these vehicles triggers the source 15 only when it receives the true IFF interrogation signal. By contrast, the operator of an enemy vehicle would not know the true interrogation signal and might note that a vehicle friendly to station 1 is transmitting a laser response to an IFF interrogation signal without, however, having the time or the ability to decipher this signal. He may, therefore, transmit a laser impulse at each signal resembling an IFF interrogation even when it is a no-response code. Thus, the danger of enemy attempts at intrusion are diminished.

Thus, the IFF system according to the invention requires only a transmitter in the interrogating station, the response receiver being simply the infra-red surveillance camera which a station of this type would already have as a rule. Because of the transmission of laser pulses by all friendly vehicles in response to the interrogations, the station operator establishes an immediate correlation between the detection and identification of the vehicles surrounding him.

The IFF system of the invention is shielded against interference partly because the interrogation signal is spread over a wide spectrum and partly because the response signal receiver is the surveillance camera itself: the interrogationing signals can therefore be transmitted only when vehicles have been detected. This system is also protected against exploitation by the adversary through the encoding of the interrogation signal and the transmission of no-resonse codes, and also because the interrogation signal is spread over a wide spectrum, resulting in a low possibility of interception. Furthermore, since the response of friendly vehicles is transmitted only towards the interrogating station, there is less chance of its being picked up by the adversary than if it were omnidirectional, as it is generally assumed that the adversary's observation means are placed in a direction different to the one in which the response is propagated.

What is claimed is:

1. A method of battlefield IFF identification comprising the steps of:

detecting a vehicle in a zone under surveillance by way of an infra-red camera by sending at least one directional and rotating coded IFF interrogation signal to the vehicle in the zone wherein said detection and transmission of the IFF interrogation signal is under the control of an operator of a detecting vehicle; and transmitting from a friendly vehicle a laser light response, said response being caused by the automatic triggering of a transmitter within said friendly vehicle, upon the decoding of a true IFF interrogation as soon as said vehicle under interrogation receives the interrogation signal.

2. Method according to the claim 1 wherein the interrogator also transmits no-response codes to which no friendly vehicle must respond.

3. Method according to the claim 1 wherein the interrogation is transmitted in the X band.

4. Method according to the claim 1 wherein the interrogation is transmitted in the Ku band.

5. Method according to the claim 1 wherein the interrogation is transmitted by a laser transmitter.

6. Method according to the claim 1 the interrogation signal has a wide spectrum.

7. A battlefield IFF system comprising an IFF interrogator with its transmission transducer, which can move rotationally, being mechanically coupled to an infra-red receiving camera connected to a display device, a system wherein each friendly vehicle has a reception transducer that works in cooperation with the said transmission transducer, the said reception transducer being connected to an IFF receiver which has its IFF signals decoding output connected to a laser pulse triggering input of an infra-red laser source, the transmitter of the said source being pointed in the same direction as the said receiving transducer.

8. System according to the claim 7 wherein the reception transducer and the laser transmitter are fixed to a support which is substantially vertical and moves rotationally.

* * * * *